(12) United States Patent
Nakaide et al.

(10) Patent No.: US 8,966,320 B2
(45) Date of Patent: Feb. 24, 2015

(54) FAULT INSPECTION UNIT, CENTRAL PROCESSING UNIT, AND FAULT INSPECTION METHOD

(75) Inventors: Minoru Nakaide, Tokyo (JP); Shinichi Toda, Tokyo (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 162 days.

(21) Appl. No.: 13/806,883

(22) PCT Filed: Jun. 21, 2011

(86) PCT No.: PCT/JP2011/064116
§ 371 (c)(1),
(2), (4) Date: Dec. 26, 2012

(87) PCT Pub. No.: WO2012/032829
PCT Pub. Date: Mar. 15, 2012

(65) Prior Publication Data
US 2013/0103984 A1   Apr. 25, 2013

(30) Foreign Application Priority Data
Sep. 8, 2010   (JP) .................................. 2010-201045

(51) Int. Cl.
*G06F 11/00*   (2006.01)
*G06F 11/273*   (2006.01)
*G06F 12/10*   (2006.01)
(Continued)

(52) U.S. Cl.
CPC .............. *G06F 11/273* (2013.01); *G06F 12/10* (2013.01); *G06F 12/1491* (2013.01); *G06F 11/2215* (2013.01); *G06F 12/145* (2013.01)
USPC .......................................................... 714/42

(58) Field of Classification Search
CPC ..... G06F 12/10; G06F 12/145; G06F 12/1491
See application file for complete search history.

(56) References Cited

U.S. PATENT DOCUMENTS

| | | | |
|---|---|---|---|
| 5,657,330 A | | 8/1997 | Matsumoto |
| 6,233,667 B1 * | | 5/2001 | Shaylor et al. ................ 711/203 |
| 7,739,474 B2 * | | 6/2010 | Engbersen et al. ........... 711/203 |

(Continued)

FOREIGN PATENT DOCUMENTS

| | | |
|---|---|---|
| CN | 101147135 A | 3/2008 |
| JP | 8-137824 | 5/1996 |

(Continued)

OTHER PUBLICATIONS

International Search Report issued Jul. 19, 2011 in corresponding International Application No. PCT/JP2011/064116.

(Continued)

*Primary Examiner* — Charles Ehne
(74) *Attorney, Agent, or Firm* — Wenderoth, Lind & Ponack, L.L.P.

(57) ABSTRACT

A CPU changes the operating mode to a test mode in which the CPU does not terminate a program being executed even if an MMU outputs a CPU exception notification, outputs an address signal for causing the MMU to output a CPU exception notification to the MMU in the test mode, and detects whether or not a CPU exception notification is input after the address signal is output to the MMU. This allows inspection as to whether or not a fault that prevents detection of an illegal access has occurred in the MMU while executing another program.

5 Claims, 4 Drawing Sheets

(51) Int. Cl.
*G06F 12/14* (2006.01)
*G06F 11/22* (2006.01)

(56) References Cited

U.S. PATENT DOCUMENTS

2004/0111655 A1 6/2004 Watanabe
2006/0179259 A1 8/2006 Kershaw et al.
2007/0226450 A1* 9/2007 Engbersen et al. ........... 711/203

FOREIGN PATENT DOCUMENTS

JP 10-289158 10/1998
JP 2004-185536 7/2004
JP 2005-216012 8/2005
JP 2006-216012 8/2006

OTHER PUBLICATIONS

Decision to Grant a Patent issued Jan. 7, 2014 in corresponding Japanese Application No. 2010-201045.
Notice of Allowance issued Jul. 28, 2014 in corresponding Korean Application No. 10-2012-7033489 (with English translation).
First Office Action issued Sep. 16, 2014 in corresponding Chinese Application No. 201180031495.9 (with English translation).

* cited by examiner

FAULT INSPECTION UNIT, CENTRAL PROCESSING UNIT, AND FAULT INSPECTION METHOD

TECHNICAL FIELD

The present invention relates to fault inspection units, central processing units, and fault inspection methods.

BACKGROUND ART

Central processing units (CPUs) can use virtual addresses to access a physical memory, such as a random access memory (RAM), divided into page units (e.g., of several kilobytes each). Virtual addresses, which differ from physical addresses, are addresses of a virtual memory having a continuous virtual space composed of discontinuous physical memory regions. When a CPU uses virtual addresses, therefore, a memory management unit (hereinafter abbreviated to "MMU") translates virtual addresses to physical addresses to enable the CPU to access physical memory.

The MMU fetches (loads) a page table, which is a translation table for translating virtual addresses to physical addresses, from the RAM into a translation look-aside buffer (hereinafter abbreviated to "TLB") and translates a virtual address for which the CPU has requested access to a physical address using this page table.

Figure 4:
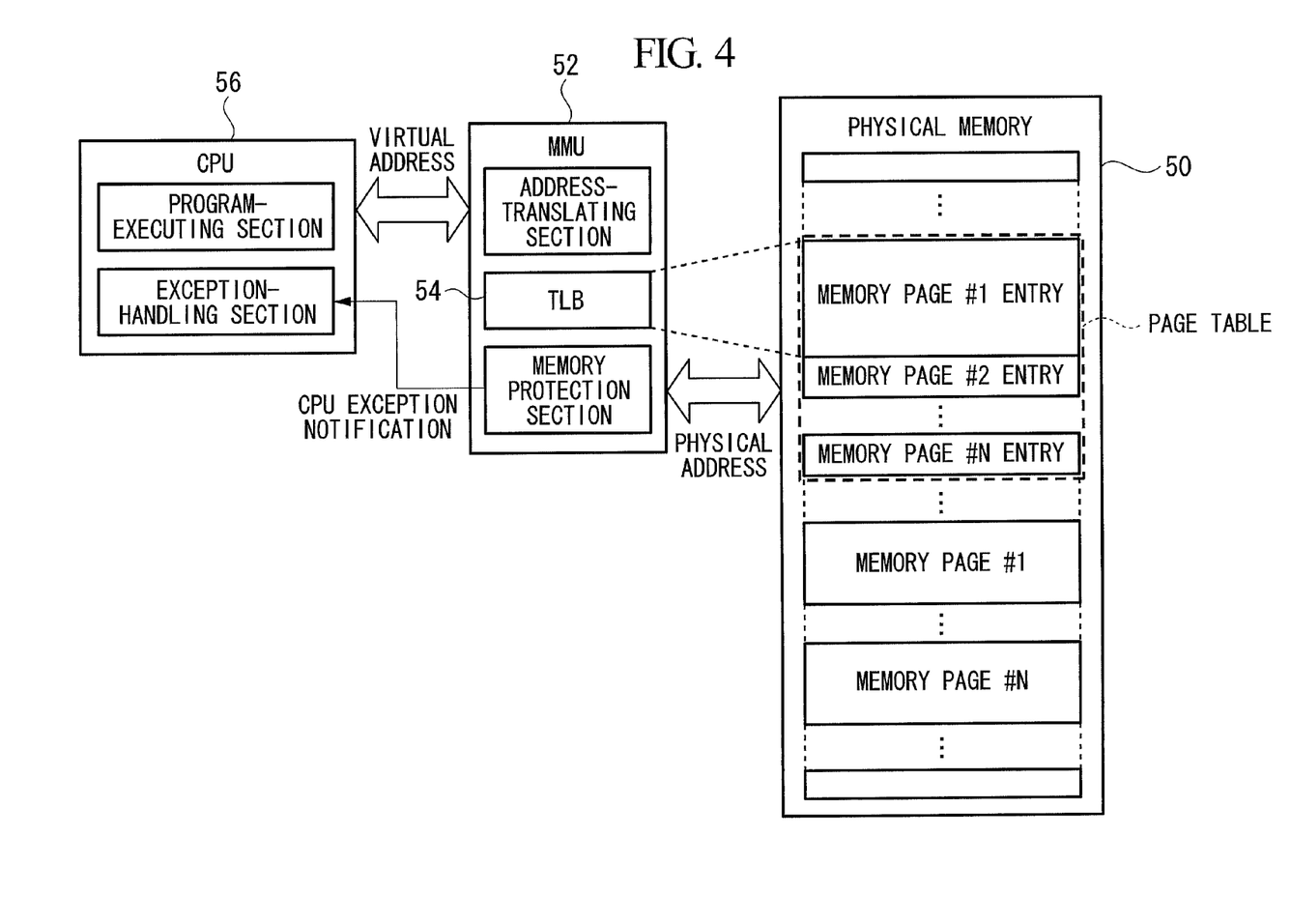
FIG. 4 is a schematic diagram used for illustration of the processing in an MMU in the related art.

As shown in the schematic view in FIG. 4, a page table has memory page entries for access to different memory pages of a physical memory 50. Each memory page entry contains the virtual and physical addresses of the corresponding memory page. The necessary memory page entry is fetched from the page table information stored in the physical memory 50 and is stored in a TLB 54 provided in an MMU 52.

The memory page entry also contains a memory protection attribute specifying, for example, "read," "write," or "execute." The technique disclosed in PTL 1 is a technique that sets a value in the protection bit of the memory protection attribute of the memory page entry fetched from the page table into the MMU to prevent a runaway task if a global variable used only by one task is accidentally overwritten by another task.

CITATION LIST

Patent Literature

{PTL 1}
Japanese Unexamined Patent Application, Publication No. HEI-10-289158

SUMMARY OF INVENTION

Technical Problem

On the other hand, if a CPU 56 shown in the schematic view in FIG. 4 inputs a virtual address corresponding to a nonexistent physical address to the MMU 52, the MMU 52 outputs a CPU exception (page fault) notification, which is a signal indicating an illegal access, to the CPU 56. However, if a failure in the MMU 52 prevents it from outputting a CPU exception notification despite the occurrence of an illegal access, the CPU 56 might operate abnormally, for example, freeze (hang up), execute a runaway process, or accidentally alter the output to another unit connected thereto.

In light of the foregoing, an object of the present invention is to provide a fault inspection unit, a central processing unit, and a fault inspection method that allow inspection as to whether or not a fault that prevents detection of an illegal access has occurred in a memory management unit while executing another program.

Solution to Problem

A fault inspection unit according to a first aspect of the present invention is a fault inspection unit provided for a central processing unit connected to a memory management unit. The memory management unit translates a physical address that is an address of a physical memory to a virtual address that is an address of a virtual memory and outputs a first signal indicating an illegal access if the physical memory is inaccessible with the physical address to which the virtual address is translated. The central processing unit outputs the virtual address to the memory management unit, allows the first signal to be input, and terminates a program being executed if the first signal is input. The fault inspection unit includes changing means for changing an operating mode of the central processing unit to a test mode in which the central processing unit does not terminate a program being executed even if the memory management unit outputs the first signal; output means for outputting a second signal for causing the memory management unit to output the first signal to the memory management unit in the test mode; and detecting means for detecting whether or not the first signal is input after the output means outputs the second signal to the memory management unit.

In the above configuration, the fault inspection unit is provided for the central processing unit connected to the memory management unit.

The memory management unit translates a physical address that is an address of a physical memory to a virtual address that is an address of a virtual memory and outputs a first signal indicating an illegal access if the physical memory is inaccessible with the physical address to which the virtual address is translated. The physical memory is, for example, a RAM, whereas the virtual memory is a memory having a continuous virtual space composed of discontinuous physical memory regions. The central processing unit outputs the virtual address to the memory management unit, allows the first signal to be input, and terminates a program being executed if the first signal is input.

The changing means changes the operating mode of the central processing unit to the test mode, in which the central processing unit does not terminate a program being executed even if the memory management unit outputs the first signal.

After the operating mode is changed to the test mode, the output means outputs a second signal for causing the memory management unit to output the first signal to the memory management unit. That is, the second signal is a signal for illegally accessing the physical memory.

After the output means outputs the second signal to the memory management unit, the detecting means detects whether or not the first signal is input.

Thus, after the operating mode of the central processing unit is changed to the test mode, a second signal for illegally accessing the physical memory is output, and it is detected whether or not a first signal indicating an illegal access is input, which allows inspection as to whether or not a fault that prevents detection of an illegal access has occurred in the memory management unit while executing another program.

Preferably, in the first aspect, the changing means resets the test mode if the first signal is input in the test mode, and the detecting means detects that the first signal is input if the test mode is reset.

In the above configuration, the changing means resets the test mode if the first signal is input in the test mode, and the detecting means detects that the first signal is input if the test mode is reset.

Thus, because the test mode is initially reset if the first signal is input in the test mode, an unnecessarily extended period of time during which the operating mode is set to the test mode can be avoided.

Preferably, in the first aspect, the second signal is a signal specifying a virtual address that does not exist in the virtual memory, a signal specifying a physical address that does not exist in the physical memory, or a signal for executing an access, to the virtual address, that violates a memory protection attribute set in a memory page entry for accessing the physical memory. In the above configuration, because the second signal is a signal specifying a virtual address that does not exist in the virtual memory, a signal specifying a physical address that does not exist in the physical memory, or a signal for executing an access that violates a memory protection attribute, a signal for illegally accessing the physical memory can be easily generated.

A central processing unit according to a second aspect of the present invention is a central processing unit that includes the fault inspection unit described above and that terminates a program being executed if the detecting means of the fault inspection unit detects that no first signal is input from the memory management unit.

In the above configuration, the central processing unit includes the fault inspection unit described above. The central processing unit terminates a program being executed if the detecting means of the fault inspection unit detects that no first signal is input from the memory management unit.

The case where no first signal is input from the memory management unit is the case where a fault that prevents detection of an illegal access by the central processing unit has occurred in the memory management unit. In this case, if the central processing unit continues to execute the program and executes an illegal access, the central processing unit might operate abnormally, for example, freeze, execute a runaway process, or accidentally alter the output to another unit connected thereto.

Accordingly, in the present invention, the central processing unit terminates a program being executed if the operating mode is set to the test mode and it is detected that no first signal is input, and therefore, the central processing unit can be prevented from operating abnormally.

A fault inspection method according to a third aspect of the present invention is a fault inspection method provided for a central processing unit connected to a memory management unit. The memory management unit translates a physical address that is an address of a physical memory to a virtual address that is an address of a virtual memory and outputs a first signal indicating an illegal access if the physical memory is inaccessible with the physical address to which the virtual address is translated. The central processing unit outputs the virtual address to the memory management unit, allowing the first signal to be input, and terminates a program being executed if the first signal is input. The fault inspection method includes a first step of changing an operating mode of the central processing unit to a test mode in which the central processing unit does not terminate a program being executed even if the memory management unit outputs the first signal; a second step of outputting a second signal for causing the memory management unit to output the first signal to the memory management unit in the test mode; and a third step of detecting whether or not the first signal is input after the second signal is output to the memory management unit.

In the above configuration, after the operating mode of the central processing unit is changed to the test mode, a second signal for illegally accessing the physical memory is output, and it is detected whether or not a first signal indicating an illegal access is input, which allows inspection as to whether or not a fault that prevents detection of an illegal access has occurred in the memory management unit while executing another program.

The present invention provides the advantageous effect of allowing inspection as to whether or not a fault that prevents detection of an illegal access has occurred in a memory management unit while executing another program.

DESCRIPTION OF EMBODIMENTS

An embodiment of a fault inspection unit, a central processing unit, and a fault inspection method according to the present invention will be described below with reference to the drawings.

An embodiment of the present invention will be described below.

Figure 1:
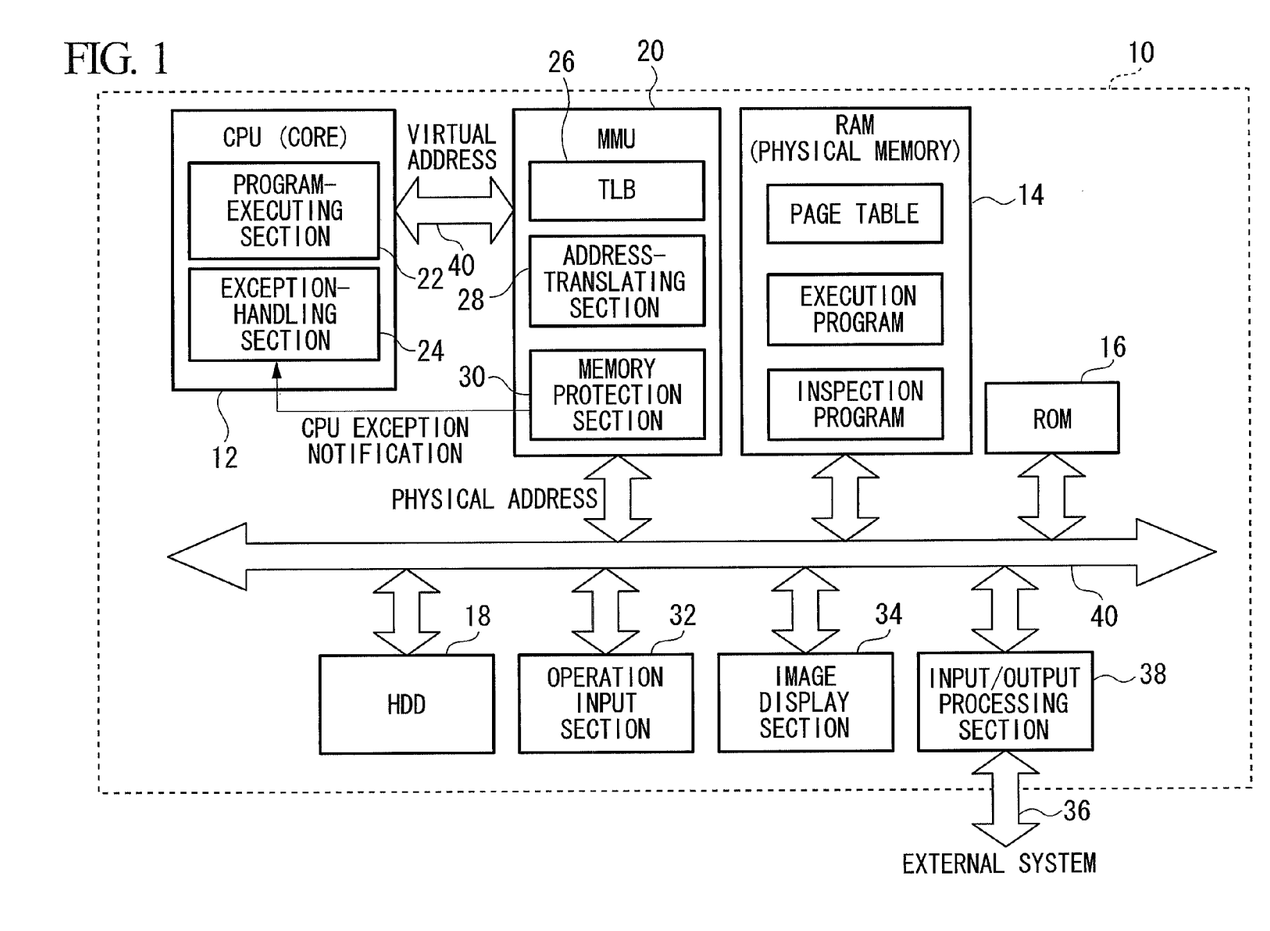
FIG. 1 is a diagram showing the relevant electrical configuration of an information processing system according to an embodiment of the present invention.

FIG. 1 is a block diagram showing the electrical configuration of an information processing system 10 according to this embodiment.

The information processing system 10 includes a CPU 12 responsible for the operation of the entire information processing system 10, a RAM 14 that is a physical memory used as, for example, a work area when the CPU 12 executes various programs, a read-only memory (ROM) 16 in which various programs, various information (data), etc. are stored in advance, and a hard disk drive (HDD) 18 serving as storage means for storing various programs and various information. The storage means used is not limited to the HDD 18 but may be other storage means that can store data, such as a flash ROM.

The CPU 12 includes a program-executing section 22 for executing a program and an exception-handling section 24 that terminates a program being executed if a CPU exception notification is input.

The CPU 12 is also connected via an internal bus 40 to an MMU 20 that translates a virtual address output from the CPU 12 to a physical address based on a translation table (hereinafter referred to as "page table") for translating virtual addresses to physical addresses.

Figure 2:
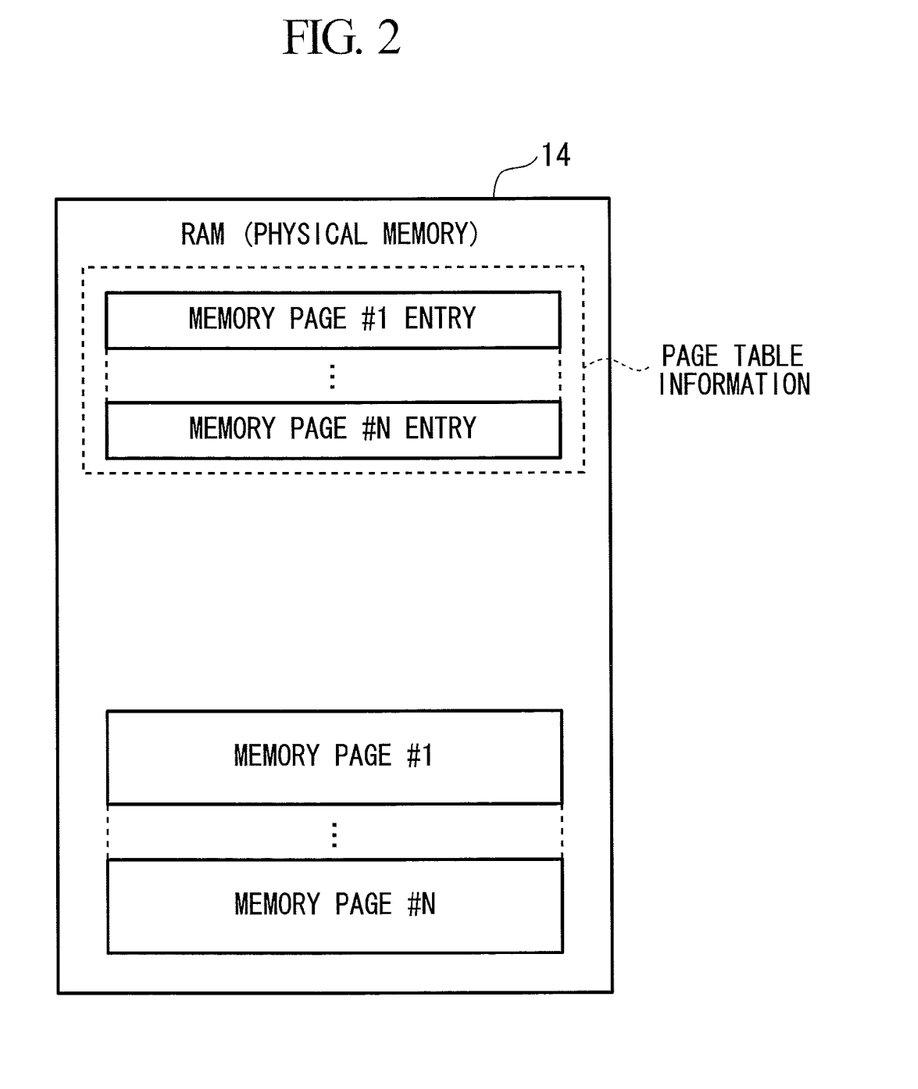
FIG. 2 is a schematic diagram showing the configuration of page table information stored in a RAM according to the embodiment of the present invention.

As shown in FIG. 2, the page table contains a plurality of memory page entries (memory page #1 entry to memory page #N entry) provided for different page units (memory pages #1 to #N (N is an integer)) in the RAM 14, which is a physical memory. Each memory page entry contains the virtual and physical addresses of the corresponding memory page and a memory protection attribute specifying, for example, "read,"

"write," "execute," or "superuser mode," which indicates that only access by privileged instructions having full access rights is accepted.

The MMU 20 includes a TLB 26, an address-translating section 28, and a memory protection section 30.

The TLB 26 stores page table information indicating a page table. More specifically, the TLB 26 fetches and stores the necessary memory page entry from the page table information stored in the RAM 14 depending on the program executed by the CPU 12.

The address-translating section 28 translates the virtual address to a physical address using the page table information fetched into the TLB 26.

The memory protection section 30 detects whether or not there is any illegal access indicating that the physical memory is inaccessible with the physical address to which the virtual address is translated by the address-translating section 28 and, if it detects any illegal access, outputs a CPU exception notification, which is a signal indicating an illegal access, to the CPU 12.

The page table information is stored in advance in the HDD 18, and when the information processing system 10 starts operating, the information is sent from the HDD 18 to the RAM 14 and is stored therein. The page table information stored in the RAM 14 is fetched into the TLB 26 depending on the program executed by the CPU 12.

The information processing system 10 also includes an operation input section 32 that is composed of, for example, a keyboard and mouse and that accepts input of various operations and an image display section 34 such as a liquid crystal display. The operation input section 32 is not limited to a keyboard and mouse but may be another input device, such as push buttons, that accepts input of operations to the information processing system 10. In addition, the image display section 34 is not limited to a liquid crystal display but may be another display device, such as light-emitting diodes (LEDs), that can notify a user of the information processing system 10 about various information.

The information processing system 10 further includes an input/output processing section 38 that is connected via a communication line 36 to an external system such as another information processing system or another system that is controlled by the information processing system 10 and that performs input and output of various information between the information processing system 10 and the external system.

The communication line 36 is, for example, a wide area network provided by a telecommunications carrier, a local communication network such as a local area network (LAN), or an external path, and may be either wired or wireless.

The MMU 20, the RAM 14, the ROM 16, the HDD 18, the operation input section 32, the image display section 34, and the input/output processing section 38 are electrically connected to each other via an internal bus 40. Thus, via the MMU 20, the CPU 12 can, for example, access the RAM 14, the ROM 16, and the HDD 18, determine the status of the operation input section 32 being operated, display an image on the image display section 34, and send and receive various information to and from the external system via the input/output processing section 38.

As described above, if the CPU 12 inputs a virtual address corresponding to a nonexistent physical address to the MMU 20, the MMU 20 outputs a CPU exception notification to the CPU 12. However, if a failure in the MMU 20 prevents it from outputting a CPU exception notification despite the occurrence of an illegal access, the CPU 12 might operate abnormally, for example, freeze, execute a runaway process, or accidentally alter the output to another unit connected thereto.

Accordingly, the information processing system 10 according to this embodiment executes a fault inspection process to inspect whether or not a fault that prevents detection of an illegal access has occurred in MMU 20 while executing another program.

Next, the operation of the information processing system 10 according to this embodiment will be described.

Figure 3:
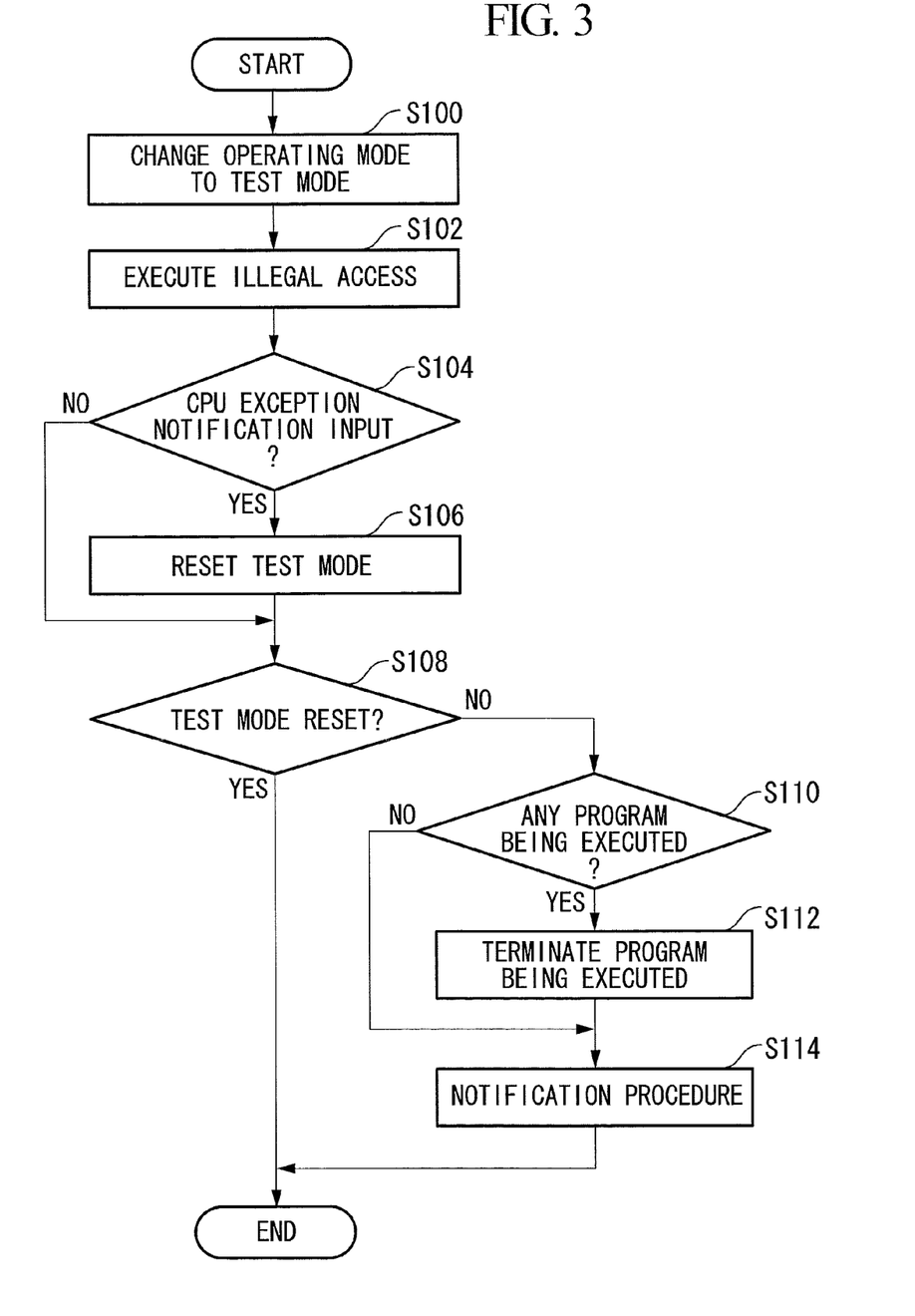
FIG. 3 is a flowchart showing the processing flow of a fault inspection program according to the embodiment of the present invention.

FIG. 3 is a flowchart showing the processing flow of a fault inspection program executed by the CPU 12 when an instruction to execute the fault inspection process is input via the operation input section 32, the program being stored in a predetermined region on the HDD 18 in advance. When an instruction to execute the fault inspection process is input, the fault inspection program is sent from the HDD 18 to the RAM 14 and is stored therein. Upon starting of the fault inspection program, the page table information corresponding to the fault inspection program is fetched into the TLB 26.

In step 100, the operating mode is changed to a test mode. The test mode is an operating mode in which the CPU 12 does not terminate a program being executed even if a CPU exception notification is output from the MMU 20 and is input to the CPU 12. As an example, if the operating mode is changed to the test mode, the CPU 12 according to this embodiment sets a flag indicating that the operating mode is set to the test mode.

In the next step 102, an illegal access to the RAM 14, which is a physical memory, is executed.

In this step, to execute an illegal access, the CPU 12 outputs to the MMU 20 an address signal specifying a virtual address that does not exist in the virtual memory, an address signal specifying a virtual address corresponding to a physical address that does not exist in the RAM 14, or an address signal for executing an access, to a virtual address, that violates a memory protection attribute set in the memory page entry for accessing the physical memory.

Examples of address signals for executing an access that violates a memory protection attribute include signals for writing in the virtual address of a memory page having no write attribute, signals for executing the contents of the virtual address of a memory page having no execute attribute (fetching an instruction code from the virtual address), and signals for accessing the virtual address of a memory page having superuser mode attribute in a normal user mode.

When the above address signal is input, the MMU 20 translates the virtual address to a physical address based on the page table information fetched into the TLB 26. However, since the input address signal results in an illegal access, the MMU 20 outputs a CPU exception notification to the CPU 12 if the MMU 20 is operating normally.

In the next step 104, it is determined whether or not a CPU exception notification is input within a predetermined period of time, and the program proceeds to step 106 if the determination is affirmative and proceeds to step 108 if the determination is negative.

In step 106, the test mode is reset. Thus, the operating mode of the CPU 12 is changed to a normal operating mode in which the CPU 12 terminates a program being executed if a CPU exception notification is input. Along with resetting the test mode, the CPU 12 according to this embodiment resets the flag indicating that the operating mode is set to the test mode.

In the next step 108, it is determined whether or not the test mode has been reset, and the program ends if the determination is affirmative and proceeds to step 110 if the determination is negative. The CPU 12 according to this embodiment makes an affirmative determination if the flag indicating that the operating mode is set to the test mode is set and makes a negative determination if the flag is not set.

That is, the case where the test mode has been reset is the case where the MMU 20 has output a CPU exception notification to the CPU 12. Conversely, the case where the test mode has not been reset is the case where the MMU 20 has output no CPU exception notification to the CPU 12, indicating that a fault that prevents detection of an illegal access has occurred in the MMU 20.

In step 110, it is determined whether or not there is any program being executed, and the program proceeds to step 112 if the determination is affirmative and proceeds to step 114 if the determination is negative.

In step 112, the program being executed by the program-executing section 22 is terminated.

In step 114, the program ends after a notification procedure is executed to notify the user about the occurrence of a fault that prevents detection of an illegal access in the MMU 20 and, if a program being executed is terminated, also about the name and other information about the terminated program, by displaying them on the screen of the image display section 34.

As described above, the CPU 12 according to this embodiment changes the operating mode to the test mode, in which it does not terminate a program being executed even if the MMU 20 outputs a CPU exception notification, outputs a signal for causing the MMU 20 to output a CPU exception notification signal to the MMU 20, and detects whether or not a CPU exception notification is input from the MMU 20.

Thus, the CPU 12 according to this embodiment can inspect whether or not a fault that prevents detection of an illegal access has occurred in the MMU 20 while executing another program.

In addition, because the CPU 12 according to this embodiment resets the test mode if a CPU exception notification is input in the test mode and detects that a CPU exception notification is input based on the fact that the test mode is reset, an unnecessarily extended period of time during which the operating mode is set to the test mode can be avoided.

In addition, because the CPU 12 according to this embodiment uses, as the signal for causing the MMU 20 to output a CPU exception notification signal, an address signal specifying a virtual address that does not exist in the virtual memory, an address signal specifying a physical address that does not exist in the physical memory, or an address signal for executing an access, to a virtual address, that violates a memory protection attribute set in the memory page entry for accessing the physical memory, a signal for illegally accessing the physical memory can be easily generated.

Furthermore, because the CPU 12 according to this embodiment terminates a program being executed if the operating mode is set to the test mode and it is detected that no CPU exception notification is input, the CPU 12 can be prevented from operating abnormally.

Although the present invention has been described above using the foregoing embodiment, the technical scope of the present invention is not limited to the scope described in the foregoing embodiment. Various modifications and improvements can be added to the foregoing embodiment without departing from the spirit of the invention, and the technical scope of the present invention embraces embodiments with such modifications and improvements.

For example, although the foregoing embodiment illustrates the case where it is detected that the CPU exception notification is output from the MMU 20 based on the fact that the test mode is reset, the present invention is not limited thereto, but may be practiced in an embodiment in which it is detected that the CPU exception notification is output from the MMU 20 by detecting the CPU exception notification itself.

In addition, although the foregoing embodiment illustrates the case where the physical memory is the RAM 14, the present invention is not limited thereto, but may be practiced in an embodiment in which the physical memory is the RAM 14 and the HDD 18.

In addition, although the foregoing embodiment illustrates the case where the notification procedure gives a notification on an image display, the present invention is not limited thereto, but may be practiced, for example, in an embodiment in which, if a printer is connected to the input/output processing section 38, the printer gives a notification by forming a message containing the notification as an image on, for example, a paper medium, or in an embodiment in which a speaker (not shown) gives a notification in the form of sound.

REFERENCE SIGNS LIST

10 information processing system
12 CPU
14 RAM
20 MMU
24 exception-handling section

The invention claimed is:

1. A fault inspection unit provided for a central processing unit connected to a memory management unit, the memory management unit translating a physical address that is an address of a physical memory to a virtual address that is an address of a virtual memory and outputting a first signal indicating an illegal access if the physical memory is inaccessible with the physical address to which the virtual address is translated, the central processing unit outputting the virtual address to the memory management unit, allowing the first signal to be input, and terminating a program being executed if the first signal is input, the fault inspection unit comprising:
 a changing unit for changing an operating mode of the central processing unit to a test mode in which the central processing unit does not terminate a program being executed even if the memory management unit outputs the first signal;
 an output unit for outputting a second signal for causing the memory management unit to output the first signal to the memory management unit in the test mode; and
 a detecting unit for detecting whether or not the first signal is input after the output unit outputs the second signal to the memory management unit.

2. The fault inspection unit according to claim 1, wherein the changing unit resets the test mode if the first signal is input in the test mode; and
 the detecting unit detects that the first signal is input if the test mode is reset.

3. The fault inspection unit according to claim 1, wherein the second signal is a signal specifying a virtual address that does not exist in the virtual memory, a signal specifying a physical address that does not exist in the physical memory, or a signal for executing an access, to the virtual address, that violates a memory protection attribute set in a memory page entry for accessing the physical memory.

4. A central processing unit comprising the fault inspection unit according claim 1,
 the central processing unit terminating a program being executed if the detecting unit of the fault inspection unit detects that no first signal is input from the memory management unit.

5. A fault inspection method provided for a central processing unit connected to a memory management unit, the memory management unit translating a physical address that is an address of a physical memory to a virtual address that is an address of a virtual memory and outputting a first signal indicating an illegal access if the physical memory is inaccessible with the physical address to which the virtual address is translated, the central processing unit outputting the virtual address to the memory management unit, allowing the first signal to be input, and terminating a program being executed if the first signal is input, the fault inspection method comprising:
- a first step of changing an operating mode of the central processing unit to a test mode in which the central processing unit does not terminate a program being executed even if the memory management unit outputs the first signal;
- a second step of outputting a second signal for causing the memory management unit to output the first signal to the memory management unit in the test mode; and
- a third step of detecting whether or not the first signal is input after the second signal is output to the memory management unit.

* * * * *